United States Patent
Harrison et al.

(10) Patent No.: US 9,534,276 B1
(45) Date of Patent: Jan. 3, 2017

(54) SEPARATION OF MANGANESE FROM BRINE

(71) Applicant: Simbol Inc., Pleasanton, CA (US)

(72) Inventors: Stephen Harrison, Benicia, CA (US); C. V. Krishnamohan Sharma, Milpitas, CA (US); Samaresh Mohanta, Dublin, CA (US)

(73) Assignee: GEOTHERMAL ENERGY PROJECT, LLC, Miami, FL (US)

( * ) Notice: Subject to any disclaimer, the term of this patent is extended or adjusted under 35 U.S.C. 154(b) by 994 days.

(21) Appl. No.: 13/622,642

(22) Filed: Sep. 19, 2012

Related U.S. Application Data

(63) Continuation-in-part of application No. 13/539,106, filed on Jun. 29, 2012, now Pat. No. 8,518,232.

(60) Provisional application No. 61/502,736, filed on Jun. 29, 2011, provisional application No. 61/536,334, filed on Sep. 19, 2011.

(51) Int. Cl.
C22B 47/00 (2006.01)

(52) U.S. Cl.
CPC ......... *C22B 47/0072* (2013.01); *C22B 47/009* (2013.01); *C22B 47/0018* (2013.01)

(58) Field of Classification Search
CPC . C22B 47/009; C22B 47/0018; C22B 47/0072
See application file for complete search history.

(56) References Cited

U.S. PATENT DOCUMENTS

| | | | |
|---|---|---|---|
| 1,932,413 A * | 10/1933 | Laury | C22B 47/00 423/50 |
| 2,145,816 A * | 1/1939 | Stoops | C01G 9/006 423/104 |
| 4,016,075 A | 4/1977 | Wilkins | |
| 4,116,856 A | 9/1978 | Lee et al. | |
| 4,159,311 A | 6/1979 | Lee et al. | |
| 4,221,767 A | 9/1980 | Lee et al. | |
| 4,291,001 A | 9/1981 | Repsher et al. | |
| 4,347,327 A | 8/1982 | Lee et al. | |
| 4,348,295 A | 9/1982 | Burba, III | |
| 4,348,296 A | 9/1982 | Bauman et al. | |
| 4,348,297 A | 9/1982 | Bauman et al. | |
| 4,376,100 A | 3/1983 | Lee et al. | |
| 4,430,311 A | 2/1984 | Lee et al. | |
| 4,461,714 A | 7/1984 | Burba, III | |
| 4,472,362 A | 9/1984 | Burba, III | |
| 4,540,509 A | 9/1985 | Burba, III | |
| 4,727,167 A | 2/1988 | Burba, III et al. | |

(Continued)

OTHER PUBLICATIONS

Cole et al., "Zinc Solvent Extraction in the Process Industries", 24(2) Mineral Proc. & Extractive Mettallurgy Rev (2003), pp. 91-137.

(Continued)

*Primary Examiner* — Arun S Phasge
(74) *Attorney, Agent, or Firm* — Fish & Tsang, LLP

(57) ABSTRACT

A method for the selective precipitation and recovery of manganese from a manganese containing solution, such as a geothermal brine is provided, wherein the geothermal brine is contacted with ammonia, an ammine, or ammonium salt at a pH of greater than about 8.0 to selectively precipitate manganese having a purity of at least about 95%. Also provided are methods for the selective recovery of manganese and zinc from a brine solution.

20 Claims, 2 Drawing Sheets

(56) References Cited

U.S. PATENT DOCUMENTS

| | | | |
|---|---|---|---|
| 5,135,652 | A | 8/1992 | Boateng |
| 5,254,225 | A | 10/1993 | Gallup |
| 5,389,349 | A | 2/1995 | Bauman et al. |
| 5,599,516 | A | 2/1997 | Bauman et al. |
| 6,017,500 | A | 1/2000 | Mehta |
| 6,280,693 | B1 | 8/2001 | Bauman et al. |
| 6,458,184 | B2 | 10/2002 | Featherstone |
| 6,555,078 | B1 | 4/2003 | Mehta |
| 6,682,644 | B2 | 1/2004 | Featherstone et al. |
| 2001/0000597 | A1 | 5/2001 | Featherstone |
| 2003/0226761 | A1 | 12/2003 | Featherstone et al. |

OTHER PUBLICATIONS

Dreisinger et al., "New Developments in the Boleo Copper-Cobalt-Zinc-Manganese Project", available at http://bajamining.com/_resources/Reports/alta_paper_2006.boleo_final.pdf.

Gotfryd et al., "Recovery of Zinc(II) from Acidic Sulfate Solutions, Simulation of Counter-Current Extraction Stripping Process", 38 Physiochemical Problems of Mineral Processing (2004), pp. 113-120.

Kawai et al., "Solvent extraction of zinc(II) and manganese(II) with 5, 10, 15,20-tetraphenyl-21H-porphine(TPP) through the metal exchange reaction of lead(II)-TPP", 7 Solvent Extr. Res. Dev. Japan (2000), pp. 36-43.

Lee et al., "Solvent Extraction of Zinc from Strong Hydrochioric Acid Solution with Alamine 336", 30(7) Bull. Korean Chem. Soc. (2009), pp. 1526-1530.

U.S. Appl. No. 12/880,924, filed Sep. 13, 2010 (Allowed, Oct. 3, 2012).

\* cited by examiner

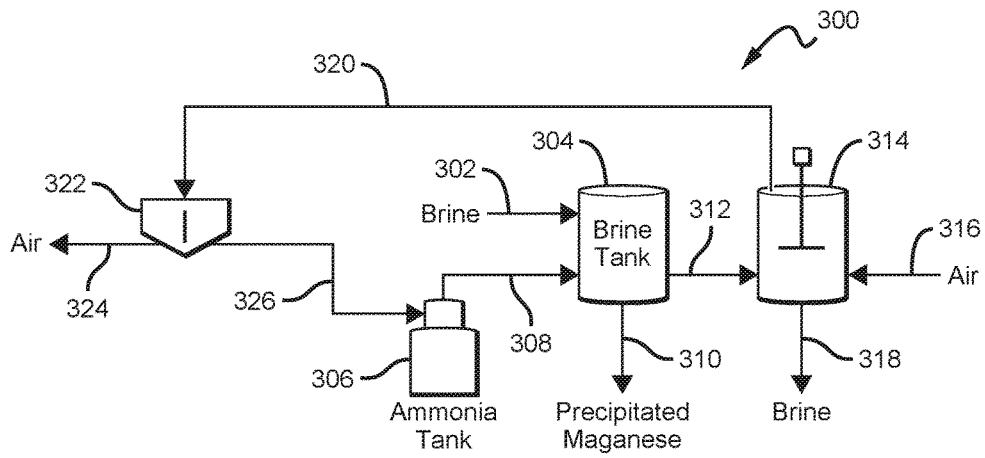
*FIG. 3*
*FIG. 4*
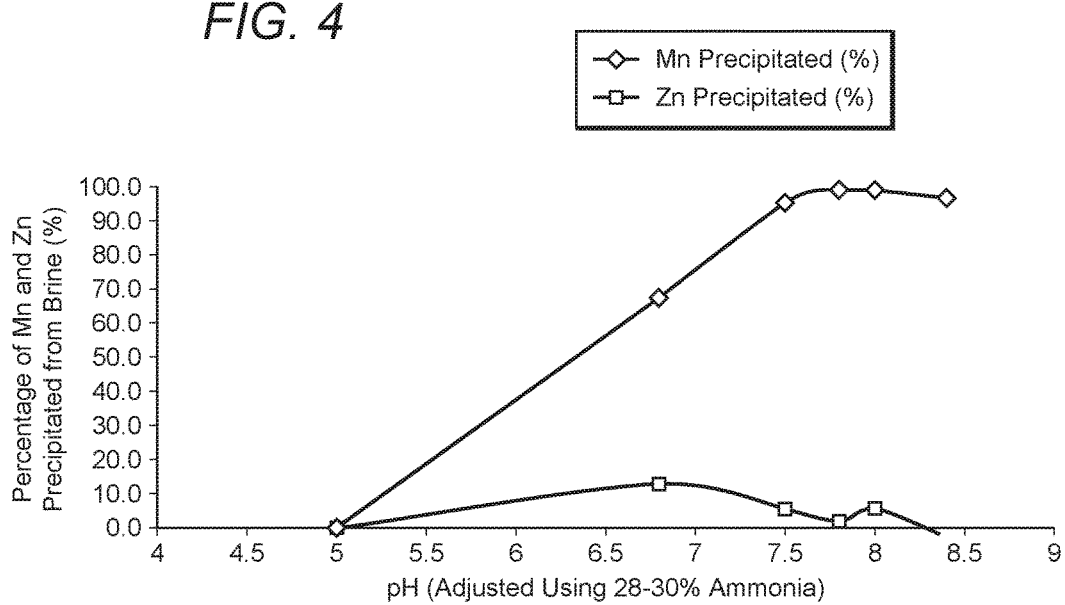

SEPARATION OF MANGANESE FROM BRINE

This application is a continuation-in-part of U.S. patent application Ser. No. 13/539,106, filed on Jun. 29, 2012, which claims priority to provisional application No. 61/502,736, filed on Jun. 29, 2011; this application further claims priority to U.S. provisional patent application Ser. No. 61/536,334, filed Sep. 19, 2011, the disclosure of which is incorporated herein by reference in its entirety.

BACKGROUND OF THE INVENTION

1. Field of the Invention

The invention generally relates to the field of removal and recovery of certain ions or metal compounds from brines, more particularly to the separation of manganese ions or manganese containing compounds from brines.

2. Description of the Related Art

Geothermal brines, such as those found in the Salton Sea, typically include various valuable metal ions, such as silver, manganese and zinc, dissolved therein. For example, the geothermal brines of the Salton Sea include about 500 mg/L of zinc and about 2000 mg/L manganese dissolved therein. Recovery of these metals, as well as others, is desirable.

Current methods for the separation and recovery of manganese from brines and other solutions that include manganese includes precipitation using $Ca(OH)_2$. This process, however, is typically not very selective and can lead to the co-precipitation of other multi-valent metal ions. This in turn requires multiple process steps to separate the various metal ions to produce manganese of a desired purity.

In this regard, methods for the economical removal and recovery of high purity manganese from manganese containing solutions, such as geothermal brines, are needed.

SUMMARY OF THE INVENTION

In one aspect, a method of separating manganese from a manganese containing solution without the co-precipitation of other metal ions in significant quantities is provided. The method includes the steps of: contacting the manganese containing solution with ammonia at a pH of greater than about 6.5 to precipitate manganese to produce a manganese precipitate and a manganese depleted solution; and separating the manganese precipitate from the solution; wherein the manganese precipitate has a purity of at least about 85%. In certain embodiments, the brine includes zinc and at least about 95% of the zinc present in the brine remains in the manganese depleted solution after the precipitation of the manganese.

In another aspect, a method for the selective precipitation and recovery of manganese and zinc from a geothermal brine is provided. The method includes the steps of: contacting the geothermal brine with ammonia at a pH of between about 6.5 and 8.8 to selectively precipitate manganese and produce a manganese depleted brine solution, without the co-precipitation of other metals present in the geothermal brine, said manganese having a purity of at least about 90%. The method further includes the step of separating of the precipitated manganese from the manganese depleted brine solution. The manganese depleted brine solution is contacted with air and/or agitated until excess ammonia is removed and the pH is reduced, and following the removal of the ammonia, lime is added until zinc is selectively precipitated from the manganese depleted brine solution, thereby producing a manganese and zinc depleted brine solution. The precipitated zinc is separated from the brine solution to produce a brine depleted in both manganese and zinc: and the manganese and zinc depleted brine solution is injected into a geothermal well.

In another aspect, a method for the selective removal of manganese and zinc from a geothermal brine is provided. The method includes the steps of: contacting the geothermal brine with lime until a pH of between about 7.5 and 8 is achieved, thereby selectively precipitating manganese and zinc from a depleted geothermal brine solution. The manganese and zinc precipitates are separated from the depleted geothermal brine solution. The manganese and zinc precipitates are contacted with ammonium or ammonium salts at a pH of between about 6.5 and 9 to dissolve the zinc precipitate and produce a zinc containing solution. The manganese precipitate is separated from the zinc containing solution. Ammonia is removed from the zinc containing solution, for example by aeration and/or agitation, and lime is added to achieve a pH of between about 7 and 9 to selectively and sequentially precipitate manganese and then zinc.

In another aspect, a method for the separation and isolation of manganese from a manganese containing brine solution is provided. The method includes the steps of: contacting a manganese containing brine solution with ammonia in a reaction tank at a pH of about 8.4 to selectively precipitate manganese from the solution and produce a manganese depleted brine solution, said manganese precipitate having a purity of at least about 90%; separating the manganese precipitate from the manganese depleted brine solution; contacting the manganese depleted brine solution, which includes ammonia, with air to separate the brine solution and the ammonia; collecting an ammonia and air stream and an ammonia-free manganese depleted brine stream; separating the air and ammonia to produce an ammonia recycle stream; and recycling the ammonia recycle stream to the step of contacting the manganese containing brine solution.

In another aspect, a method for the selective precipitation and recovery of manganese and zinc from a geothermal brine is provided. The method includes the steps of: contacting the geothermal brine with ammonia at a pH of between about 6.5 and 8.8 to selectively precipitate manganese and produce a manganese depleted brine solution, without the co-precipitation of other metals present in the geothermal brine, said manganese having a purity of at least about 90%. The method further includes the step of separating of the precipitated manganese from the manganese depleted brine solution. The manganese depleted brine solution is contacted with air and/or agitated until excess ammonia is removed and the pH is reduced, and following the removal of the ammonia, an ion exchange agent is added until zinc is selectively precipitated from the manganese depleted brine solution, thereby producing a manganese and zinc depleted brine solution. The precipitated zinc is separated from the brine solution to produce a brine depleted in both manganese and zinc; and the manganese and zinc depleted brine solution is injected into a geothermal well.

BRIEF DESCRIPTION OF THE DRAWINGS

The characteristic novel features of the invention are set forth in the appended claims. So that the manner in which the features, advantages and objects of the invention, as well as others that will become apparent, may be understood in more detail, more particular description of the invention briefly summarized above may be had by reference to the embodiment thereof which is illustrated in the appended drawings, which form a part of this specification. Note, however, that the drawings illustrate only an embodiment of the invention and are therefore not to be considered limiting of the invention's scope as it may apply to other equally effective embodiments.

FIG. 3 is a process diagram according to one embodiment of the present invention.

FIG. 4 is a graph showing precipitation of manganese as a function of pH.

DETAILED DESCRIPTION

Definitions

Figure 1:
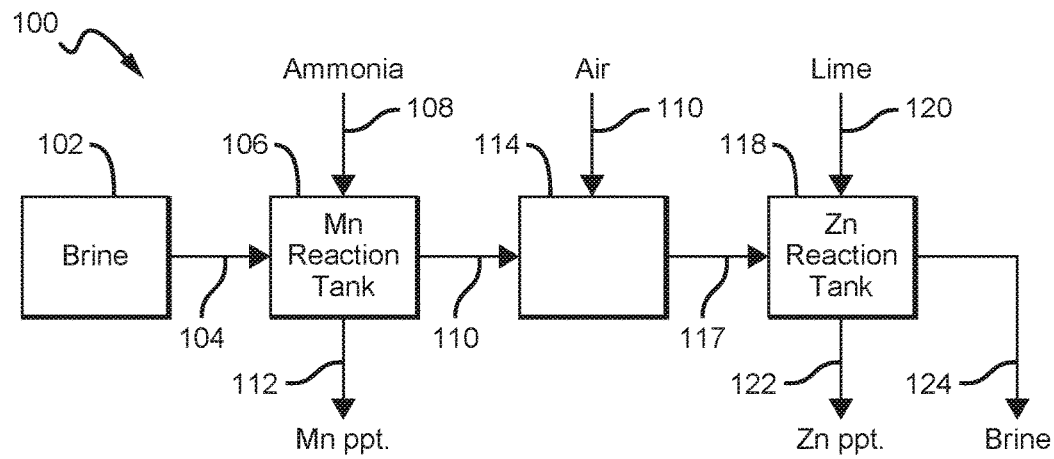
FIG. 1 is an exemplary reaction scheme according to one embodiment of the present invention.

As used herein the following terms shall have the following meanings:

The term "amines" shall refer to primary, secondary, and tertiary amines, including inorganic amines, unless otherwise specified.

The term "brines" refers to synthetic or naturally occurring solutions that contain or are saturated with large amounts of salts, including those from geothermal sources.

Geothermal brines, such as those found in the Salton Sea, can include many dissolved metal salts, including alkaline, alkaline earth, and transition metal salts. In one embodiment, the present invention provides a method for separating manganese, as well as zinc, lead, and silver, from brines, particularly geothermal brines. In certain embodiments, the present invention utilizes the coordination chemistry of the various metals to facilitate separation thereof.

For example, the binding affinity or binding strength of transition metals with certain amine compounds, including primary, secondary, and tertiary amines, to preferentially form either a solid precipitate or a soluble complex can change, depending upon several experimental factors. Exemplary factors that can affect whether the metal salt will typically form a solid precipitate include basicity of the amine, the hydrophilici hydrophobic nature of the amine, steric hindrance of the amine, whether the amine coordinates directly with the metal or forms one or more polymeric coordination complexes with the metal, solution pH, ionic strength of the solution, crystallization kinetics, and solvation properties. Because the formation of metal-amine coordination complexes can be influenced by so many factors. It is possible, however, to customize/optimize an amine through extensive screening to selectively precipitate or dissolve a targeted metal(s) from a geothermal brine or solution that includes a targeted metal merely by identifying the binding characteristics of the metal for a given amine. In this context, ammonia, an inorganic amine, is very unique in that it can act as both base and a ligand simultaneously, depending upon the solution conditions, such as the pH and/or the concentration of metal salts and/or ammonia in the solution.

For example, in certain embodiments, ammonia reacts with certain hexaaqua metal ions in solution to form metal hydroxide (see, eq. 1 and 2) precipitates or soluble metal ammonium coordination complexes (see, eq. 3), depending upon ammonia concentration. In equations 1 and 2, ammonia acts as a base to form the metal hydroxide precipitates. In equation 3, ammonia acts as a ligand, resulting in a clear solution having the metal complex dissolved therein.

$$[M(H_2O)_6]^{2+} + NH_3 \rightleftharpoons [M(H_2O)_5(OH)]^+ + NH_4^+ \qquad \text{eq. 1}$$

$$[M(H_2O)_6]^{2+} + 2NH_3 \rightleftharpoons [M(H_2O)_4(OH)_2] + 2NH_4^+ \qquad \text{eq. 2}$$

$$[M(H_2O)_6]^{2+} + 6NH_3 \rightleftharpoons [M(NH_3)_6]^{2+} \qquad \text{eq. 3}$$

Furthermore, it certain embodiments, the metal ion and ammonia can form one of several possible intermediate complex species that may be isolated, wherein the metal ion coordination sphere can include ammonia, water and hydroxyl groups, depending upon the composition of the salt solution, temperature, pH, and ammonia concentration. The chemical equilibrium involving the precipitation and dissolution of metals salts can thus be advantageously used to selectively isolate certain transition metals from brines and metal containing solutions.

Figure 2:
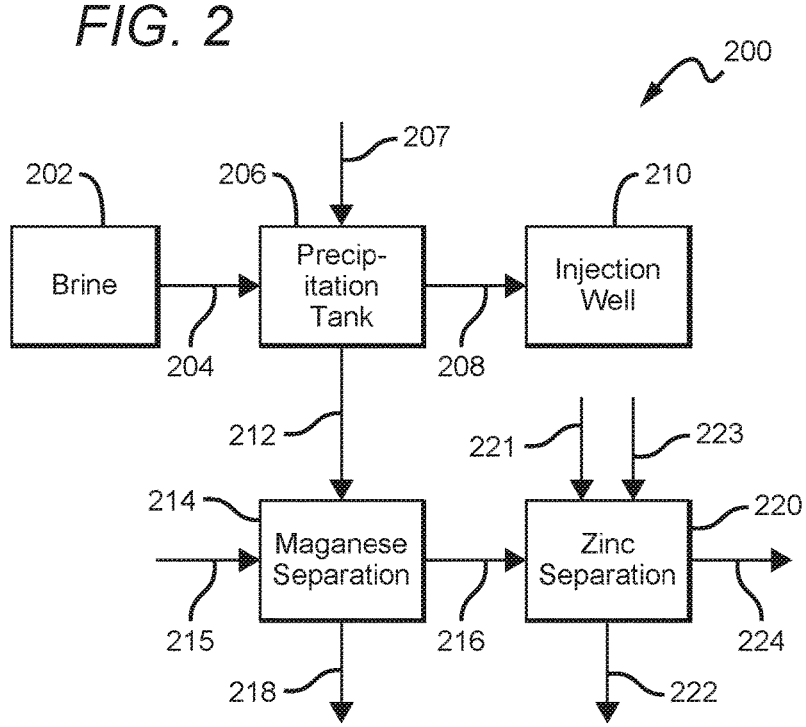
FIG. 2 is an exemplary reaction scheme according to one embodiment of the present invention.

Referring now to FIG. 1, one embodiment of the present invention is provided. Process 100 for the selective removal of manganese from a manganese containing solution, such as a geothermal or other brine, is provided. Brine 102 is provided via line 104 to manganese reaction tank 106. In certain embodiments, the brine supplied to manganese reaction tank 106 may first have undergone a silica and/or iron removal step, wherein at least about 70% of the silica and/or at least about 70% of the iron has been removed from the brine. An amine, such as ammonia, is supplied via line 108 to manganese reaction tank 106, where it contacts the manganese containing solution to selectively precipitate manganese, while not precipitating other ions from the manganese containing solution, such as zinc. In certain embodiments, the manganese can be precipitated from the manganese containing solution, while at least 90% of the zinc remains in solution (i.e., is not precipitated with the manganese). Alternatively, at least about 95% of the zinc remains in solution, alternatively at least about 97%, alternatively at least about 98%, alternatively at least about 99%, alternatively at least about 99.9%, and alternatively at least about 99.99%. The manganese precipitate can be washed with an aqueous solution and dried to produce a manganese containing compound having a purity, as measured by ICP, of greater than about 85% by weight, alternatively greater than about 90%, alternatively greater than about 95%, alternatively greater than about 97%, alternatively greater than about 99%. Purity, as used herein, refers to the amount (by weight) of the manganese containing compound, relative to amount (by weight) of other elements and compounds in the precipitate. The manganese reaction tank 106 is maintained at a pH of at least about 6.5, alternatively between about 7 and 8.6, alternatively at least about 8.2, alternatively at least about 8.4, to limit co-precipitation of other metal ions. A manganese oxide and/or manganese hydroxide precipitate can be collected from reaction tank 106 via line 112. In certain embodiments, it is believed that the manganese hydroxide will be precipitated, particularly if the presence of oxygen is minimized during the steps of pH adjustment, washing, and drying. In certain embodiments, manganese oxide will predominantly precipitate as $Mn_3O_4$ and/or may contain other phases of manganese oxide and/or manganese hydroxide. The brine, having a reduced concentration of manganese, also referred to as a manganese depleted brine solution, can optionally be supplied via line 110 to a holding tank 114. In certain embodiments, the brine can be supplied via line 110 into an injection well (not shown). Air is supplied to produce a reduced pH brine solution having a pH of less than about 7, alternatively less than about 6, alternatively between about 5 and 6. The reduced pH solution can be supplied from holding tank 114 via line 117 to zinc reaction tank 118, which can also be supplied with lime supplied via line 120, to increase the pH to greater than about 7, alternatively be a pH of between about 7.2 and 7.7, alternatively about 7.5, thereby causing the zinc to precipitate. The zinc precipitate can be collected via line 122, and the remaining brine solution, having a reduced concentration of both manganese and zinc, also referred to as a manganese and zinc depleted brine solution, can be removed via line 120. Brine removed via line 124 can be supplied to an alternate process for the recovery of additional metal ions, or alternatively can be supplied to an injection well (not shown). In another embodiment, an ion exchange agent can be used instead of lime to precipitate zinc. Exemplary ion exchange agents include DOWEX-K-21 resin beads, di(2-ethylhexyl)phosphonic acid (DEH2PA), and 2-ethylhexylphosphonic acid Referring now to FIG. 2, another embodiment of the present invention is provided. Process 200 for the selective removal of manganese and zinc from a manganese and zinc containing solution, such as a geothermal or other brine, is provided. Brine that includes manganese and zinc is provided from tank 202 via line 204 to precipitation tank 206, where the brine is combined with lime supplied via line 207 to provide a pH of between about 7.5 and 8, thereby precipitating zinc and manganese. The remaining brine solution, have a decreased concentration of manganese and zinc, can be supplied via line 208 to injection well 210, or alternatively supplied to an alternate process for the removal of additional metal ions (not shown). The solid manganese and zinc can be supplied from tank 206 via line 212 to a manganese separation process 214, where the solids are contacted with an ammonium salt that is supplied via line 215, such as ammonium chloride, until a pH of at least about 7.5, alternatively at least about 8.8, alternatively about 9.0 is achieved, to dissolve zinc precipitates, while the manganese remains as a solid. In certain embodiments, at least 90% of the zinc is dissolved. Alternatively, at least about 95% of the zinc is dissolved, alternatively at least about 97% of the zinc is dissolved, alternatively at least about 98% of the zinc is dissolved, alternatively at least about 99% of the zinc is dissolved, alternatively at least about 99.9% of the zinc is dissolved, and alternatively at least about 99.99% of the zinc is dissolved. The solid manganese is collected via line 218, and the zinc containing solution 216 is supplied to a zinc precipitation process 220, it is contacted with air supplied via line 221, preferably supplied via a bubbler, until a major portion of the ammonia present has been removed, for example at least about 70%, alternatively about 80%, or alternatively about 90%, and then lime supplied via line 223, to produce a pH of between about 7 and 8.5, alternatively less than 8, alternatively between about 6.8 and 7.7, alternatively between about 7 and 8, or preferably about 7.5. As used herein, the removal of a major portion of the ammonia refers to the removal of at least about 70% by volume of the ammonia present, alternatively at least about 80%. Reducing the pH by the steps of removing a major portion of the ammonia present and by the addition of lime is effective to facilitate the precipitation of a zinc precipitate, which can be collected via line 222. Waste solution that can include calcium, lead, sodium, potassium, and other ions, can be removed via line 224.

It is understood that various means can be employed for isolating precipitated solids, including filters, settling tanks, centrifuges, and the like. It is also understood that purification of collected solids can include means for washing solids with water.

Referring now to FIG. 3, one embodiment of the present invention is provided. Brine is supplied from a holding tank or directly from the source, such as a geothermal well, via line 302 to brine tank 304. To brine tank 304, an amine, such as ammonia, can be supplied via line 308 from amine holding tank 306. The amine is supplied in known amounts to selectively precipitate manganese present in the brine, while other ions present in the brine, such as zinc, remain in solution. In certain embodiments wherein the amine is ammonia, the ammonia is added in quantities sufficient to achieve a pH of greater than about 6.5, alternatively between about 7 and 8.5. The solid manganese containing precipitate can be collected from brine tank 304 via line 310. In certain embodiments, the manganese can be precipitated from the manganese containing solution, while at least 90% of the zinc remains in solution (i.e., is not precipitated with the manganese). Alternatively, at least about 95% of the zinc remains in solution, alternatively at least about 97%, alternatively at least about 98%, alternatively at least about 99%, alternatively at least about 99.9%, and alternatively at least about 99.99%. The solution in brine tank 304, which includes brine (having a lower manganese concentration than originally supplied) and ammonia are supplied via line 312 to tank 314, which can include stirring means, such as a mechanical stirrer, and can be supplied with air via line 316. Air can be added via line 316 to reduce the pH of the solution selectively to less than 7, preferably between 5 and 6. Contacting the solution with air enables the ammonia present to be removed as a gas from tank 314 via line 320 and ammonia-free brine can be removed from the tank via line 318. Ammonia removed via line 320 can be supplied to a separation tank wherein air is separated via line 324 and ammonia is separated via line 326, and can be recycled back to amine holding tank 306. In certain embodiments, amine holding tank 306 can be supplied with fresh make up ammonia, as needed or desired.

Examples

Approximately 10 g of a synthetic geothermal brine having an approximate pH of 5.2 and a composition that mimics the composition of Salton Sea (generally, the simulated brine has a composition of about 260 ppm lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silicate (reported as $SiO_2$), and 181,000 ppm chloride) was titrated with a solution that contains about 28-30% by volume ammonia to a maximum pH of about 8.5. The solids began precipitating when the pH of solution was about 6.5. A portion of the brine was decanted and analyzed at various pH levels to identify and estimate the precipitated metal salts (see, Table 1 and FIG. 4). Table 1 shows that in the presence of ammonia, manganese precipitates from the brine solution with highest selectivity, and the amount of zinc that is co-precipitated with the manganese varied from between about 0 to 10%, depending upon the pH of the solution. Furthermore, the solids that precipitated at a pH of about 8 were washed, dried (at 100° C.) and digested to analyze the components of the precipitate and purity of the manganese solids. The digested sample revealed that two metal elements were present under the given experimental conditions, specifically Mn (366.4 mg/g) and Zn (8.06 mg/g). The remainder of metal elements, if present, were below detection limits.

The results of the analysis at various pH values is provided in both FIG. 4 and Table 1, which shows the composition of the synthetic brine before contacting with ammonia, and the composition of the decanted brine that has been separated from the precipitated solids at various different pH levels. As shown in the table, at a pH of about 6.8, approximately 67% of manganese and 13% of zinc that was initially present in the brine solution precipitated around pH 6.8, however, as the pH is increased to about 7.8, the percentage of manganese that was precipitated increased up to a maximum of almost 99%, while the amount of zinc that is precipitated decreases to about 2%.

TABLE 1

Brine composition after precipitation using 28-30% ammonia solution

|  | Ba, mg/L | Ca, mg/L | K, mg/L | Li, mg/L | Mg, mg/L | Mn, mg/L | Na, mg/L | Sr, mg/L | Zn, mg/L | B, mg/L |
|---|---|---|---|---|---|---|---|---|---|---|
| Control | 194.4 | 41120 | 23060 | 283.7 | 11.96 | 2311 | 73650 | 418.1 | 777.3 | 511.1 |
| pH 6.8 | 234.2 | 48610 | 27420 | 341.8 | 20.51 | 746.9 | 86860 | 497.4 | 676.5 | 566.5 |
| pH 7.5 | 212.4 | 44050 | 24540 | 305.1 | 18.39 | 108.1 | 75880 | 432.9 | 734.4 | 537.8 |
| pH 7.8 | 194.7 | 40790 | 22670 | 279.9 | 15.88 | 28.56 | 71040 | 403.7 | 762.1 | 509.4 |
| pH 8 | 192.1 | 40280 | 22370 | 275.8 | 13.81 | 32.94 | 69490 | 395.3 | 734.1 | 498.4 |
| pH 8.4 | 217.2 | 43560 | 25130 | 317 | 5.551 | 84.03 | 78470 | 446.5 | 797.3 | 539.5 |

As shown in FIG. 1, these results indicate that at higher pH values, i.e., at a pH of about 8.5, zinc forms a soluble coordination complex, with no measurable precipitate formed, while manganese forms a metal hydroxide/oxide precipitate. In certain embodiments, it is believed that the precipitated and dried solids may include $Mn_3O_4$ and ZnO. The manganese oxides purity from the digestion studies indicated the purity was about 98%. Further optimization of pH and experimental conditions could increase the manganese oxide purity to significantly higher levels.

As is understood in the art, not all equipment or apparatuses are shown in the figures. For example, one of skill in the art would recognize that various holding tanks and/or pumps may be employed in the present method.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

We claim:

1. A method of selective separation of manganese from a manganese containing brine, the method comprising the steps of:

contacting the manganese containing brine with an amine or an ammonium salt at a pH of greater than about 6.8 to precipitate manganese to produce a manganese precipitate and a manganese depleted solution; and separating the manganese precipitate from the solution;

wherein the manganese precipitate has a purity of at least about 85%.

2. The method of claim 1 wherein the brine includes zinc and at least about 95% of the zinc present in the brine remains in the manganese depleted solution after the precipitation of the manganese.

3. The method of claim 2 wherein the less than 10% of non-manganese ions precipitates.

4. The method of claim 1 wherein the amine is ammonia.

5. The method of claim 1 wherein the amine or ammonium salt containing solution also includes a base selected from an alkali, an alkaline hydroxide.

6. The method of claim 1 further comprising the step of washing the manganese precipitate with an aqueous solution.

7. The method of claim 1 wherein precipitation of manganese occurs without significant co-precipitation of other ions.

8. The method of claim 1 wherein the pH is between about 6 and 8.

9. The method of claim 1 wherein the manganese precipitate has a purity of at least about 95%.

10. The method of claim 1 wherein the geothermal brine is from the Salton Sea.

11. The method of claim 1 further comprising injecting the manganese depleted solution into an injection well.

12. A method for the selective precipitation and recovery of manganese and zinc from a geothermal brine, the method comprising the steps of:

contacting the geothermal brine with ammonia at a pH of between about 7 and 8.6 to selectively precipitate manganese and produce a manganese depleted brine solution, without the co-precipitation of other metals present in the geothermal brine;

separating the precipitated manganese from the manganese depleted brine solution;

contacting the manganese depleted brine solution with air and lime until a pH of less than 8 is achieved to selectively precipitate zinc from the manganese depleted brine solution, thereby producing a manganese and zinc depleted brine solution;

separating the precipitated zinc from the manganese and zinc depleted brine solution; and injecting the manganese and zinc depleted brine solution into a geothermal well.

13. The method of claim 12 wherein at least 95% of the zinc present in the geothermal brine remains in solution after the manganese precipitation step.

14. The method of claim 12 wherein the manganese depleted brine solution is contacted with air and lime until a pH of between about 5.5 and 6.5 is achieved.

15. The method of claim 12 wherein at least a portion of ammonia is recovered in the separation step and supplied to the contacting step.

16. A method for the selective removal of manganese and zinc from a geothermal brine, the method comprising the steps of:
   contacting the geothermal brine with lime until a pH of between about 7.5 and 8 is achieved, thereby selectively precipitating manganese and zinc from a depleted geothermal brine solution;
   separating the manganese and zinc precipitates from the depleted geothermal brine solution;
   contacting the manganese and zinc precipitates with an ammonium salt at a pH of at least about 8.8 to dissolve the zinc precipitate and produce a zinc containing solution;
   separating the manganese precipitate from the zinc containing solution;
   contacting the zinc containing solution with air, until the ammonia is removed and adding lime to maintain the pH at between about 7 and 8.5 to precipitate zinc hydroxide or zinc hydroxide derivatives;
   and isolating the zinc precipitate.

17. A method for the separation and isolation of manganese from a manganese containing brine solution, the method comprising the steps of:
   contacting a manganese containing brine solution with ammonia in a reaction tank at a pH of about 6.5 to 8.5 to selectively precipitate manganese from the solution and produce a manganese depleted brine solution, said manganese precipitate having a purity of at least about 95%;
   separating the manganese precipitate from the manganese depleted brine solution;
   contacting the manganese depleted brine solution, which includes ammonia, with air to separate the brine solution and the ammonia;
   collecting an ammonia and air stream and an ammonia-free manganese depleted brine stream;
   separating the air and ammonia to produce an ammonia recycle stream; and recycling the ammonia recycle stream to the step of contacting the manganese containing brine solution.

18. The method of claim 17 further comprising reinjecting the manganese depleted brine solution into a geothermal well.

19. The method of claim 17 wherein the ion exchange agent is selected from the group consisting of phosphonic acids.

20. A method for the selective removal of manganese and zinc from a geothermal brine, the method comprising the steps of:
   contacting the geothermal brine with ammonia at a pH of between about 7 and 8.6 to selectively precipitate manganese and produce a manganese depleted brine solution, without co-precipitation of other metals present in the geothermal brine;
   separating the precipitated manganese from the manganese depleted brine solution;
   contacting the manganese depleted brine solution with a gas and an ion exchange agent until a pH of less than 8 is achieved to selectively precipitate zinc from the manganese depleted brine solution, thereby producing a manganese and zinc depleted brine solution;
   separating the precipitated zinc from the manganese and zinc depleted brine solution; and
   injecting the manganese and zinc depleted solution into a geothermal well.

* * * * *